(12) United States Patent
Panz et al.

(10) Patent No.: US 8,852,394 B2
(45) Date of Patent: Oct. 7, 2014

(54) SUBMERGED COMBUSTION HEATING WATER EVAPORATION FOR NATURAL GAS WELLS

(75) Inventors: Eric Leopold Panz, West Vancouver (CA); Steven Eric Panz, West Vancouver (CA); Wesley Young, Burnaby (CA); Roger P. Boulter, Harlingen, TX (US)

(73) Assignee: Inproheat Industries Ltd., Vancouver, BC (CA)

( * ) Notice: Subject to any disclaimer, the term of this patent is extended or adjusted under 35 U.S.C. 154(b) by 456 days.

(21) Appl. No.: 13/157,679

(22) Filed: Jun. 10, 2011

(65) Prior Publication Data

US 2011/0303368 A1 Dec. 15, 2011

Related U.S. Application Data

(60) Provisional application No. 61/353,501, filed on Jun. 10, 2010.

(51) Int. Cl.
*C02F 1/04* (2006.01)
*B01D 1/14* (2006.01)
*C02F 101/32* (2006.01)
*B01D 21/02* (2006.01)

(52) U.S. Cl.
CPC . *B01D 1/14* (2013.01); *C02F 1/048* (2013.01); *C02F 2101/32* (2013.01); *B01D 21/02* (2013.01); *Y10S 159/04* (2013.01)
USPC .............. 159/16.2; 159/47.3; 159/DIG. 4; 202/175; 202/234; 202/264; 202/265; 203/10; 261/77; 261/121.1; 261/123; 210/776; 122/31.2; 126/360.1

(58) Field of Classification Search
USPC .......... 159/16.2, 47.3, DIG. 4; 202/163, 175, 202/176, 234, 264, 265; 203/10; 261/77, 261/121.1, 123; 210/774, 776, 175; 122/31.2; 126/360.2; 196/120
See application file for complete search history.

(56) References Cited

U.S. PATENT DOCUMENTS

| | | | | |
|---|---|---|---|---|
| 1,675,347 A | * | 7/1928 | Hammond et al. | 122/32 |
| 1,952,727 A | * | 3/1934 | Ralston | 209/166 |
| 2,350,943 A | * | 6/1944 | Thompson et al. | 209/165 |
| 2,867,972 A | * | 1/1959 | Holderreed et al. | 159/16.2 |
| 2,890,166 A | * | 6/1959 | Heinze | 208/102 |
| 3,060,921 A | * | 10/1962 | Luring et al. | 126/360.2 |
| 3,174,820 A | * | 3/1965 | See et al. | 423/528 |
| 3,209,745 A | * | 10/1965 | Glaser et al. | 126/343.5 R |
| 3,285,834 A | * | 11/1966 | Guerrieri et al. | 203/11 |
| 3,317,306 A | * | 5/1967 | Getsinger et al. | 71/43 |
| 3,868,355 A | * | 2/1975 | Rodgers | 530/374 |
| 4,570,612 A | * | 2/1986 | Ripka et al. | 126/360.2 |

(Continued)

FOREIGN PATENT DOCUMENTS

DE    19835434 A1 *  2/2000  ............... B03D 1/24

*Primary Examiner* — Nina Bhat
*Assistant Examiner* — Jonathan Miller
(74) *Attorney, Agent, or Firm* — Chernoff Vilhauer McClung & Stenzel, LLP

(57) ABSTRACT

Apparatus for evaporating waste water having chemicals therein which cause foaming comprises a holding tank having an inlet for receiving waste water, one or more submerged combustion chambers with burners suspended within the holding tank, and, one or more foam skimming weirs located in an upper portion of the holding tank, the one or more foam skimming weirs defining one or more foam collection zones.

16 Claims, 11 Drawing Sheets

(56) References Cited

U.S. PATENT DOCUMENTS

| | | | |
|---|---|---|---|
| 4,913,805 A * | 4/1990 | Chin | 209/164 |
| 4,915,784 A * | 4/1990 | Reynolds | 162/15 |
| 5,094,075 A * | 3/1992 | Berendes | 60/303 |
| 5,342,482 A * | 8/1994 | Duesel, Jr. | 159/16.2 |
| 5,549,831 A * | 8/1996 | Bowles et al. | 210/650 |
| 5,595,663 A * | 1/1997 | Bowles et al. | 210/652 |
| 5,606,965 A * | 3/1997 | Panz et al. | 126/360.2 |
| 5,615,668 A | 4/1997 | Panz et al. | |
| 5,636,623 A * | 6/1997 | Panz et al. | 126/360.2 |
| 6,273,153 B1 * | 8/2001 | Reinsch | 141/65 |
| 6,293,277 B1 * | 9/2001 | Panz et al. | 126/360.2 |
| 6,338,337 B1 * | 1/2002 | Panz et al. | 126/360.2 |
| 7,214,290 B2 * | 5/2007 | Duesel et al. | 159/16.2 |
| 7,416,172 B2 * | 8/2008 | Duesel et al. | 261/77 |
| 7,845,314 B2 * | 12/2010 | Smith | 122/379 |
| 8,043,479 B2 * | 10/2011 | Duesel et al. | 203/11 |
| 2003/0000895 A1 * | 1/2003 | Hensley et al. | 210/670 |
| 2009/0211764 A1 * | 8/2009 | Fielding et al. | 166/357 |
| 2011/0089013 A1 * | 4/2011 | Sakurai et al. | 201/2 |
| 2011/0139378 A1 * | 6/2011 | Lakatos et al. | 159/4.01 |

* cited by examiner

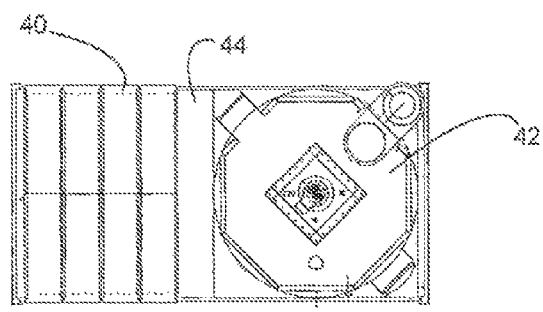
Figure 13
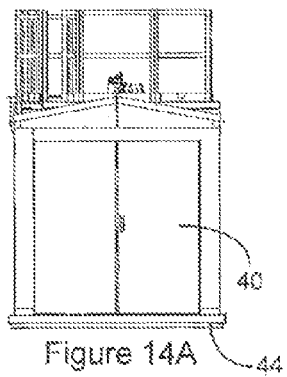 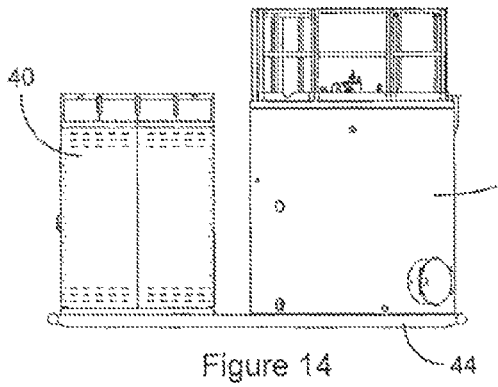 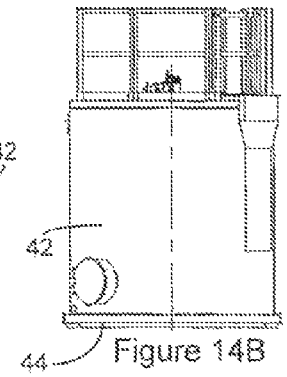
Figure 14A  Figure 14  Figure 14B

SUBMERGED COMBUSTION HEATING WATER EVAPORATION FOR NATURAL GAS WELLS

REFERENCE TO RELATED APPLICATION

This application claims priority from U.S. Provisional Patent Application Ser. No. 61/353,501 filed 10 Jun. 2010 and entitled SUBMERGED COMBUSTION HEATING WATER EVAPORATOR AND FOAM REMOVAL SYSTEM FOR NATURAL GAS WELLS. The benefit under 35 U.S.C. §119 (e) of this applications is hereby claimed, and this application is hereby incorporated herein by reference.

TECHNICAL FIELD

This invention relates to a novel system of reducing waste water disposal problems at a natural gas well site by reducing the volume of waste water to be hauled away that is typically produced in conjunction with extraction of natural gas. More particularly, certain embodiments involve reducing the volume of haul-away water by utilizing submerged combustion heating technology. Certain embodiments also pertain to a novel system for removing foam from flow back water from a natural gas well after the gas producing formation of the gas well has been treated with fracturing agents and chemicals.

BACKGROUND

In recent years, mankind has become increasingly aware of damage to the environment caused by on-site dumping of waste products which are often contaminated with harmful chemicals and other agents. As a consequence, regulations have been introduced by various regulatory authorities to forbid the dumping of waste products at locations other than controlled waste disposal sites.

Historically, in the natural gas well drilling and production field, it has been customary for companies drilling the gas wells and companies operating the gas wells to simply dump waste water, which is typically produced in a natural gas well, onto the ground adjacent the gas well. Regulations have recently been enacted which no longer permit such disposal. It has therefore become necessary to utilize water tank trucks to visit gas well sites on a frequent basis to collect the water and haul it away to a sanctioned water disposal site. This has become a very costly procedure. One way to reduce such expenses is to reduce the volume of water that is collected in a separator and tank of a gas producing well. The inventors have determined a strong need for efficient trouble-free technology that can dramatically reduce the volume of water produced by the gas well at the gas well site. This in turn dramatically reduces the volume of water that must be hauled away by water tank truck, and reduces operating expenses.

Submerged combustion heating is a method whereby hot products of combustion are forced through a liquid or liquid-solid mixture to heat the liquid or liquid-solid mixture and evaporate water. A major advantage of this heating system is that the heat exchange occurs directly between the hot gaseous products of combustion and the liquid. Thus there is no solid interface that interferes with efficient heat exchange. In a submerged combustion system, the hot combustion products are generated by a 2800° F. flame which is typically fuelled by a combination of air and natural gas. The air under positive pressure is usually generated by a positive displacement blower. The flame generates hot combustion gases which contact the liquid to be heated, but the flame itself does not normally come into contact with the liquid.

Submerged combustion heated liquids have an overall system efficiency of greater than 90%. Conventional hot water boiler indirect heating systems have an efficiency of about 80% Immersion tube heating systems have an efficiency of about 70%.

In applications where separation of components by distillation or absorption is required, submerged combustion heating can be applied to generate liquid or liquid-solid temperatures up to about 195° F. This temperature approaches the boiling point of water, and is applicable to most industrial and domestic liquid or liquid-solids heating applications.

In addition to high performance efficiency, submerged combustion heating systems are advantageous because they maintain a uniform temperature throughout the liquid in which the submerged combustion is conducted. This is because the hot gaseous combustion products pass rapidly as bubbles through the liquid and keep the liquid in constant agitation, thereby distributing heat evenly. Submerged combustion heating systems are also suitable for heating contaminated liquids, or liquids with low medium or high solids contents. Expenses are usually lower than with other heating systems because the submerged combustion heating can be performed in a liquid holding tank which can operate at ambient pressures, thereby eliminating the need for pressurization. Unlike boiler heating applications, a certified operating engineer is not required to operate a submerged combustion heating system.

The following patents relate to submerged combustion heating systems:
1. U.S. Pat. No. 5,606,965, granted Mar. 4, 1997 entitled "Submerged Combustion System";
2. U.S. Pat. No. 5,615,668, granted Apr. 1, 1997, entitled "Apparatus for Cooling Combustion Chamber in a Submerged Combustion Heating System";
3. U.S. Pat. No. 5,636,623, granted Jun. 10, 1997, entitled "Method and Apparatus for Minimizing Turbulence in a Submerged Combustion System";
4. U.S. Pat. No. 6,293,277 B1, granted Sep. 25, 2001, entitled "Sludge Treatment System Using Two-Stage Heat Recovery Submerged Combustion; and
5. U.S. Pat. No. 6,338,337 B1, granted Jan. 15, 2002, entitled "Two-Stage Heat Recovery for Submerged Combustion Heating System".

The subject matter and contents of these five aforementioned U.S. patents insofar as they are relevant to the subject invention is incorporated herein by reference.

The inventors have determined a need for effective apparatus and methods for reducing the volume of water at gas well sites.

SUMMARY

This summary is provided to introduce a selection of representative concepts and aspects of the invention in a simplified form that are further described below in the description. This summary is not intended to identify key features or essential features of the claimed subject matter, nor is it intended to be used in any way that would limit the scope of the claimed subject matter.

One aspect provides apparatus for evaporating waste water having chemicals therein which cause foaming. The apparatus comprises a holding tank having an inlet for receiving waste water, one or more submerged combustion chambers with burners suspended within the holding tank, and, one or more foam skimming weirs located in an upper portion of the holding tank, the one or more foam skimming weirs defining one or more foam collection zones.

One aspect provides a method for evaporating waste water having chemicals therein which cause foaming. The method comprises providing a holding tank having an inlet for receiving waste water and one or more submerged combustion chambers with one or more burners suspended within the holding tank, burning fuel with the one or more burners to generate hot combustion gasses in the one or more combustion chambers to evaporate the waste water, and, skimming foam off of a surface of liquid in the holding tank with one or more foam skimming weirs located in an upper portion of the holding tank, the one or more foam skimming weirs defining one or more foam collection zones.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 13 illustrates a plan view of an example water evaporator unit according to another embodiment with an accompanying building housing a natural gas driven engine and a positive displacement blower, all mounted on a skid.

FIG. 14 illustrates a front elevation view of the water evaporator unit of FIG. 13.

FIGS. 14A and 14B respectively illustrate left and right side elevation views of the water evaporator unit of FIG. 13.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Some embodiments described below provide evaporator units comprising submerged combustion apparatus configured to evaporate waste water from natural gas wells in production. Such production waste water often has relatively high levels of salt and other dissolved materials which may be deposited on surfaces during evaporation. Some embodiments described below provide evaporator units configured to evaporate waste water which flows back to the surface when a new well is hydraulically fractured. Such flowback waste water often has hydrocarbons and other chemicals therein that can cause foaming during evaporation.

Figure 1:
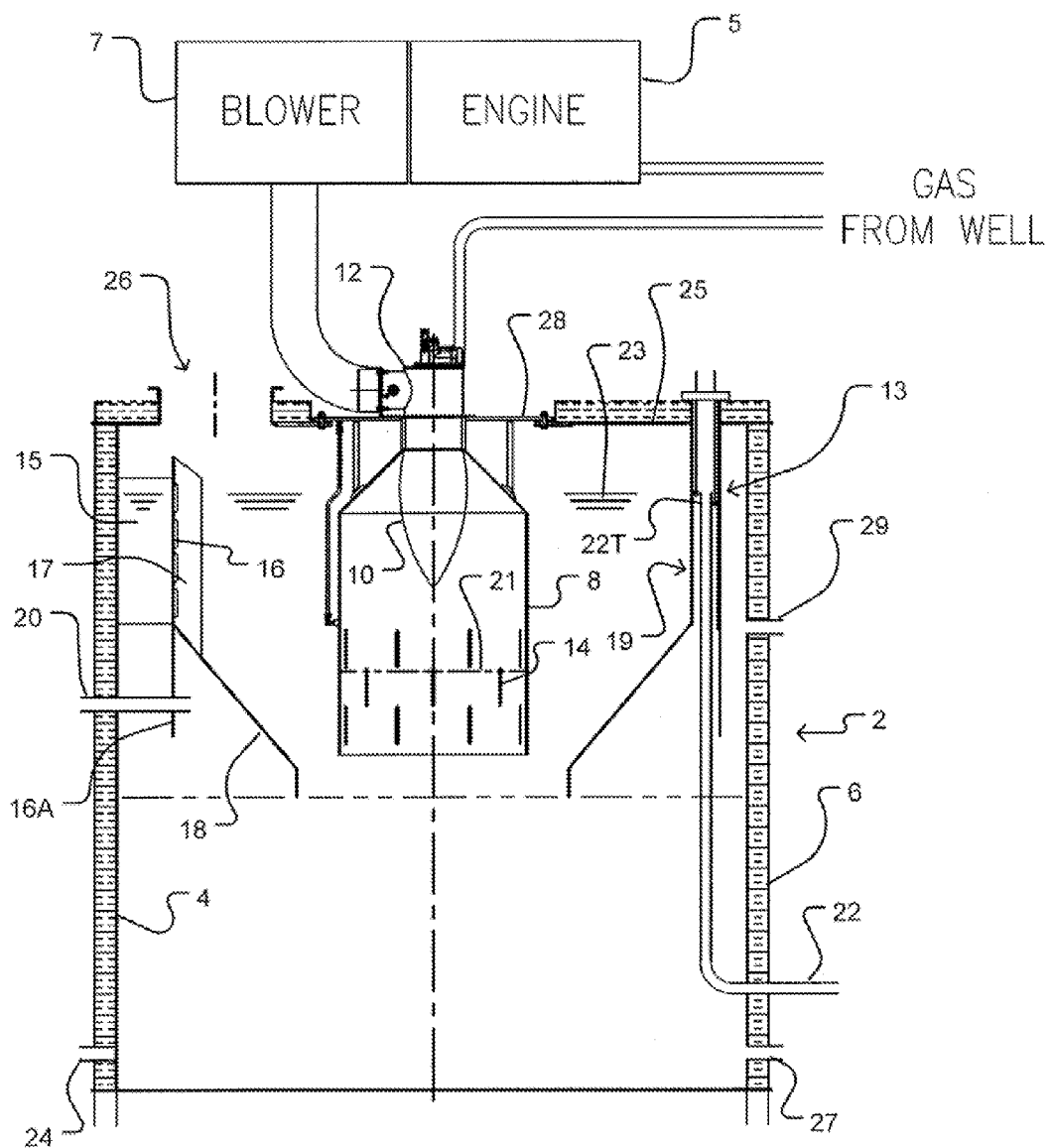
FIG. 1 illustrates a section elevation of an example water evaporator unit according to one embodiment.

FIG. 1 illustrates an elevation section view of an example water evaporator unit 2 according to one embodiment. The water evaporator unit 2 comprises a holding tank 4, which has insulation 6 around its exterior circumference. The holding tank 4 may, for example, comprise a cylindrical steel tank. A submerged combustion chamber 8 is suspended within the upper portion of the holding tank 4 from a top plate 28, which is removably secured to the flat tank top 25. The submerged combustion chamber 8 may, for example, be generally cylindrical. The submerged combustion chamber 8 comprises a burner 12, which uses air provided by a blower 7 driven by an engine 5. The engine 5 may, for example, comprise a Chevrolet natural gas fired V8 engine. The blower 7 may, for example, comprise a positive displacement blower. The burner 12 together with the air from the positive displacement blower burns natural gas and produces a downwardly extending flame 10.

Located around the lower circumference of the submerged combustion chamber 8 are a series of vertical slots 14 arranged in three tiers. These slots 14 in each row are offset from one another. The slots 14 may be at least 6 inches high in some embodiments. The tops of the slots 14 of one row may be generally aligned with the bottoms of the slots 14 of the row above in some embodiments. In some embodiments the tops of the slots 14 of one row may overlap with the bottoms of the slots 14 of the row above. The rows of slots 14 may span a substantial portion of the height of the combustion chamber 8. For example, in some embodiments the rows of slots 14 may span about ¼ or ⅓ of the height of the combustion chamber.

The submerged combustion chamber 8 is positioned within an inner tank 16 located within the upper interior of the holding tank 4. The inner tank 16 may, for example, be generally cylindrical. The inner tank 16 is of less diameter than the holding tank 4 but of greater diameter than the cylindrical combustion chamber 8. The inner tank 16 has a conical portion 18 near an open bottom thereof which permits precipitated salts and suspended solids to drop into the lower region of the holding tank 4. The inner tank also has an extended side portion 16A located outside of the conical portion 18. The inner tank 16 may be held in place by spacers 15 located at a number of positions about the circumference thereof which connect the inner tank 16 to the inner walls of the holding tank 4. For example, in some embodiments four spacers 15 may be evenly distributed around the periphery of inner tank 16. The inner tank 16 may also have a plurality of antiswirl vanes 17 extending inwardly from the inner wall thereof. For example, in some embodiments four antiswirl vanes 17 may be evenly distributed around the periphery of the inner tank 16. The antiswirl vanes 17 may reduce or eliminate formation of swirling currents in the liquid in the inner tank 16.

Waste water from a water separator of a gas well is introduced into the interior of the tank 4 through inflow 20. Such waste water has typically had a majority of hydrocarbons removed therefrom, but some hydrocarbons may remain in the waste water. Such waste water also typically has a relatively high level of total dissolved solids (TDS) therein, often including salt. An outflow 22 has a top portion 22T located at the upper region of the tank 4, and may be located at a side of the tank 4 opposite the inflow 20. The outflow 22 allows excess water to exit the tank 4. The outflow 22 may, for example, be located near the top of a stilling well 19 formed at or near an inner wall of the inner tank 16. The bottom of the stilling well 19 opens into a reduced turbulence region or "dead zone" formed between the extended side portion 16A and the conical portion 18 of the inner tank 16. The outflow 22 thus also facilitates removal of any oil or other liquid hydrocarbons introduced through the inlet 20, since such oil or other liquid hydrocarbons will generally remain within the dead zone and tend to accumulate on the surface of liquid within the stilling well 19. Float type level switches 13 may be provided just above and just below the top 22T of the outflow 22. Level switches 13 may be connected to a control system of a feed pump (not shown) which provides waste water to the evaporator unit 2. The liquid level in the tank 4 is indicated by dotted line 23. A precipitate solids outlet 24 is located at the lower region of the tank 4. A stack 26, which enables combustion gases and evaporated water to exit from the interior of the evaporator unit 2 is located in the tank top 25. The stack 26 may be open to the atmosphere in some embodiments.

Figure 1A:
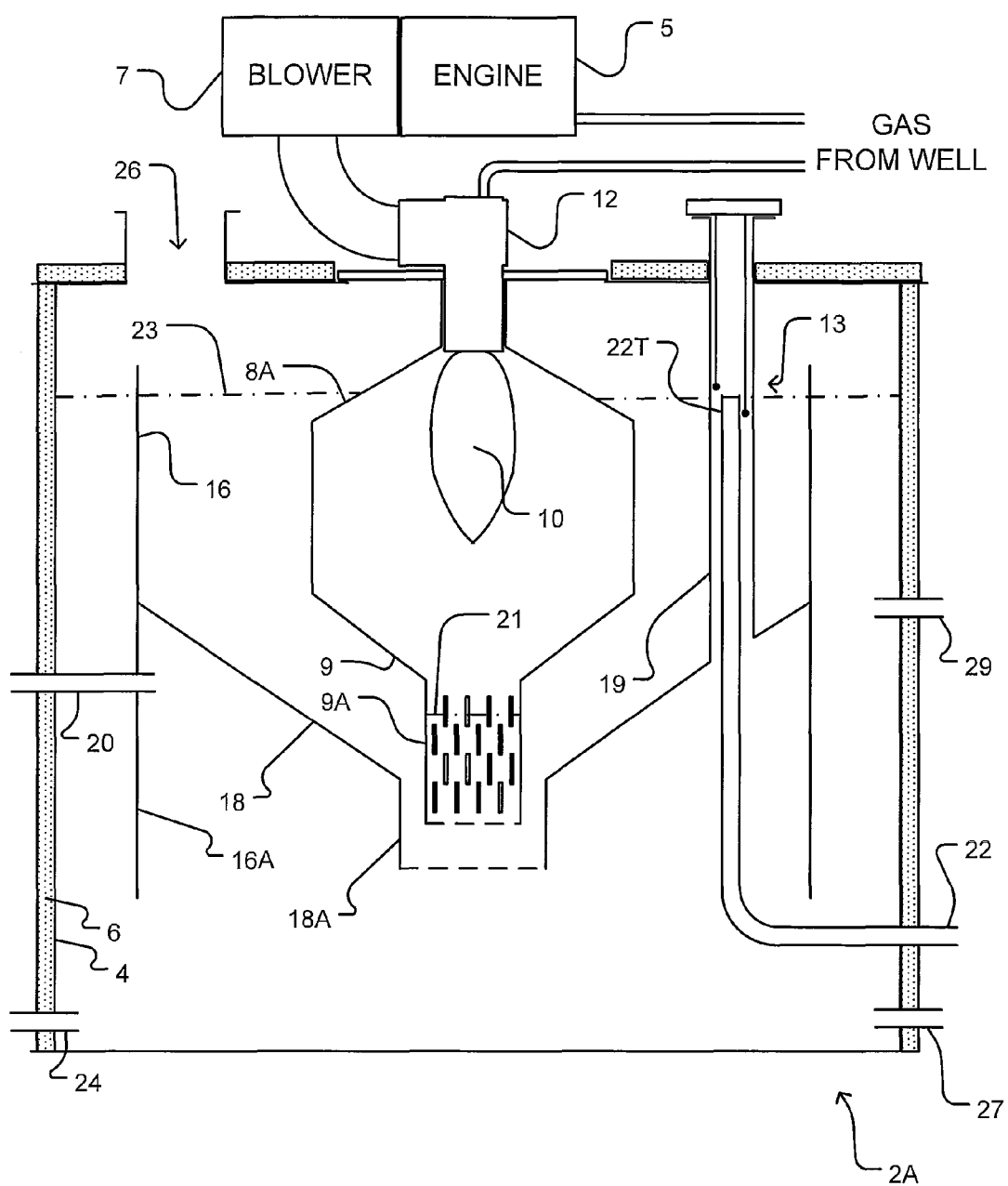
FIG. 1A illustrates a section elevation of an example water evaporator unit according to another embodiment.

FIG. 1A shows a water evaporator unit 2A according to another embodiment. The evaporator unit 2A of FIG. 1A differs from unit 2 of FIG. 1 in shape of the combustion chamber 8A. The combustion chamber 8A of the FIG. 1A embodiment has a conical portion 9 and a reduced diameter cylindrical portion 9A at the bottom thereof. The arrangement of FIG. 1A may provide more hydraulic stability to the region below the combustion chamber 8A from the turbulent zone above. The slots 14 of the combustion chamber 8A are formed in the cylindrical portion 9A thereof, which is located at least partially within a cylindrical sleeve 18A extending downwardly from the conical portion 18 of the inner tank 16. (In some embodiments the slots 14 may be located entirely or almost entirely within the cylindrical sleeve 18A.) This arrangement may, for example, provide reduced turbulence inside the inner tank 16 as hot combustion gasses exiting the slots 14 are constrained by the cylindrical sleeve. The inner tank 16 of the FIG. 1A embodiment also comprises a longer extended side portion 16A which may isolate and/or dampen transients due to sparging of the hot combustion gasses.

In operation, hot combustion gases generated by flame 10 in the interior of the submerged combustion chamber 8/8A, which can be 2800 F, exit the interior of the combustion chamber through slots 14. The liquid level in the tank 4, indicated by dotted lines 23, is at a higher level than the liquid level 21 in the interior of the combustion chamber 8/8A. This is caused by the positive pressure of the hot combustion gases in the interior of the combustion chamber 8/8A. On start up, the generation of hot combustion gases exerts a positive pressure which causes liquid level 21 within the combustion chamber 8/8A to drop until the tops of the upper row of vertical slots 14 are exposed. At that point, the hot combustion gases are able to escape the interior of the combustion chamber 8/8A and bubble upwardly in the liquid between the exterior of combustion chamber 8/8A and the interior of the cylindrical tank 16. A balance is reached between the positive pressure in the submerged combination chamber 8 and the hydrostatic pressure of the liquid in the cylindrical tank 16 on the exterior of the chamber 8/8A. The balance level is also affected by factors such as the width of the slots 14, the area of exposure of the vertical slots 14 above liquid level 21, and the specific gravity of the liquid in the cylindrical tank 16. The specific gravity rises over time as water is evaporated from the liquid.

In operation, it has been found that after the evaporator unit 2 has been in operation for a period of time, salts and other soluble components in the liquid, as the liquid becomes concentrated, tend to precipitate out and settle downwardly through the open bottom of the open conical bottom 18 of the inner tank 16. It has also been found that as the liquid in the cylindrical tank 16 becomes concentrated due to evaporation of water caused by the hot combustion gases, salts and other soluble components in the liquid in the combustion chamber 8/8A and the interior of the tank 16 tend to precipitate and deposit on the vertical slots 14. Thus the effective gas exit area of the slots 14 decreases with deposit buildup and the liquid level in the interior of the combustion chamber 8/8A therefore tends to drop in order to expose more area of the vertical slots 14 so that the hot combustion gases can continue to exit through the slots 14 into the liquid in the exterior of the combustion chamber 8/8A. The situation is somewhat dynamic because the salts and solids that collect on the slots 14 tend to grow and break off with time and then settle through conical bottom 18 into the lower area of tank 4. The slots 14 then become wider for a time. By providing rows of slots 14 which span a substantial portion of the height of the combustion chamber 8/8A, by providing positive air pressure to the burner 12 with the positive displacement blower 7, the evaporator units 2/2A of FIGS. 1 and 1A can accommodate relatively large variations in the liquid level 21 as deposits form on and break off of slots 14.

Precipitated solids are collected at the bottom of the tank 4 and periodically can be withdrawn from the interior of the tank 4 as a slurry through solids outlet 24. A jetting port 27 is also located in the bottom region of the tank 4 and enables water to be injected under pressure into the lower regions of the interior of the tank 4 to stir up the precipitated solids and thereby form a slurry which can more readily be withdrawn through solids outlet 24. The jetted water exits from jet water outlet 29.

In the embodiments of FIGS. 1 and 1A, the water evaporator unit 2/2A is powered by a natural gas powered engine 5 which drives a positive displacement blower 7 which is connected to the combustion chamber 8/8A and provides combustion air for the natural gas burning burner 12 and creates positive gas pressure displacement in the interior of the submerged combustion chamber 8/8A. The burner 12 and the gas powered engine driving the positive displacement blower 7 of the water evaporator unit 2/2A are both typically powered by well head gas obtained at a gas well site. Thus, in most cases, no outside source of power is required.

Figure 2:
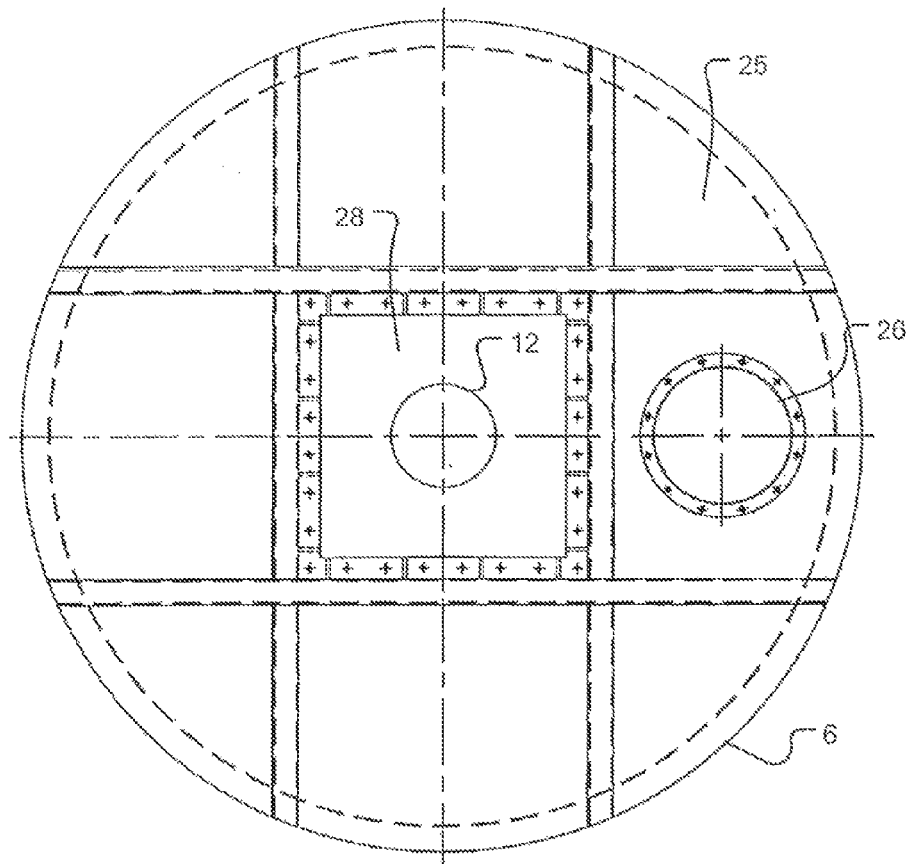
FIG. 2 illustrates a plan view of the water evaporator unit of FIG. 1.

FIG. 2 illustrates a plan view of the water evaporator unit 2 of the FIG. 1 embodiment. As seen in FIG. 2, the square top plate 28, which holds the burner 12, is secured by bolts or some other suitable fastening mechanism to the top cylindrical plate 25 of the cylindrical steel tank 4. Vent stack 26 for expelling air and evaporated water is also shown located at the right side of top plate 28. The square top plate 28, by being bolted or secured by some other suitable mechanism to top plate 25, enables the burner 12 and the underlying submerged combustion chamber (not visible), which is suspended under the square top plate 28, to be removed upwardly from the interior the cylindrical tank for maintenance. Insulation 6, surrounding the cylindrical tank 4, is shown in FIG. 2 and maintains heat within the tank 4.

Figure 3:
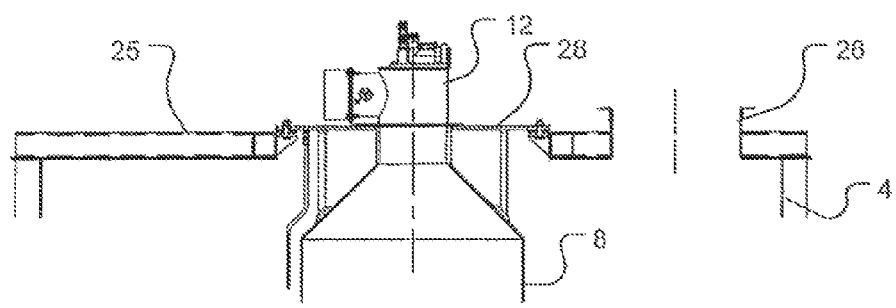
FIG. 3 illustrates a detail section elevation of the top of the water evaporator unit of FIG. 1 including the burner.

FIG. 3 illustrates a detail section elevation of the top of the water evaporator unit 2 including burner 12. As seen in FIG. 3, the top plate 28 carries the burner 12 and the submerged combustion chamber 8, which is suspended under the top plate 28. When maintenance is required on the submerged combustion chamber 8, the bolts securing the top plate 28 to the circular top plate 25 of the tank 4 are disengaged and the combustion chamber 8 and burner 12 are lifted upwardly from the interior of the tank 4.

Figure 4:
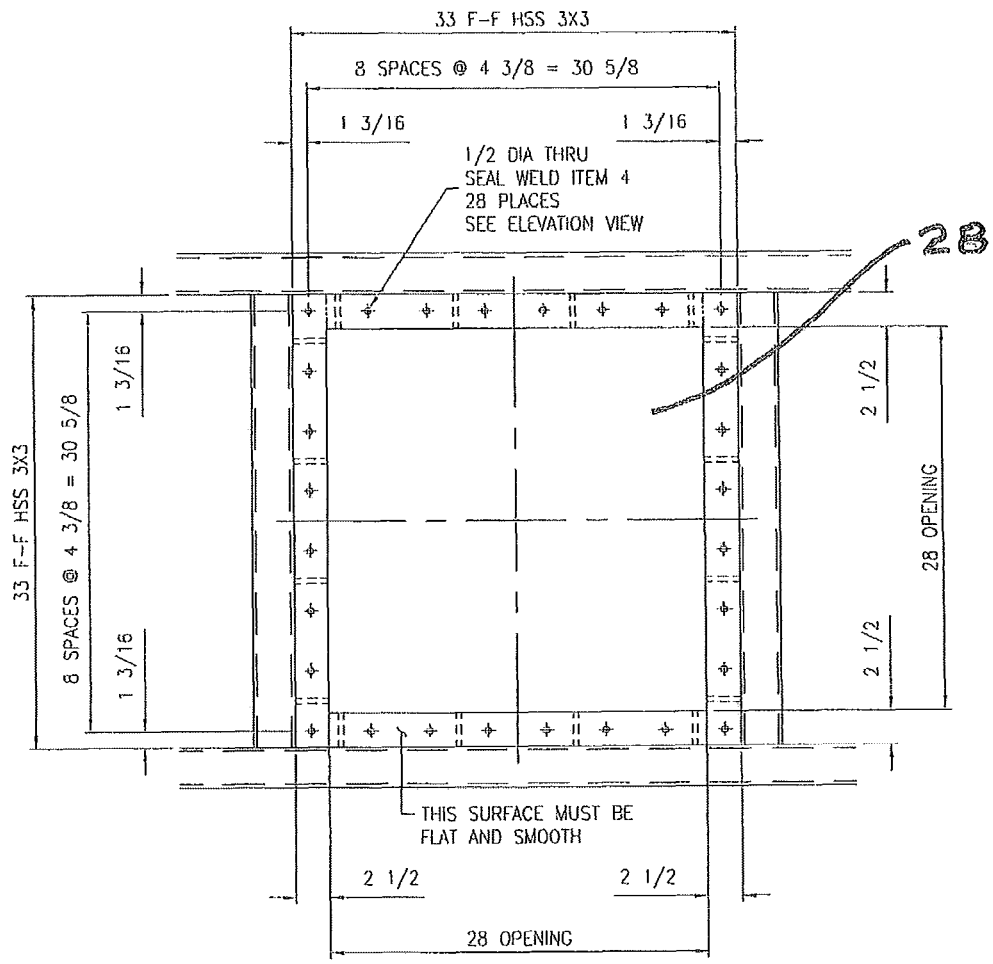
FIG. 4 illustrates a plan view of the removable top plate of the water evaporator unit of FIG. 1.
Figure 5:
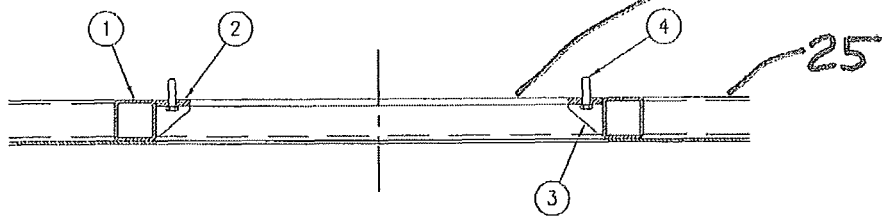
FIG. 5 illustrates a detail section elevation of the top plate of the water evaporator unit of FIG. 1.

FIG. 4 illustrates a detailed plan view of the removable top plate 28 of the water evaporator unit 2. FIG. 5 illustrates a detail elevation section view of the top plate 28.

Figure 6:
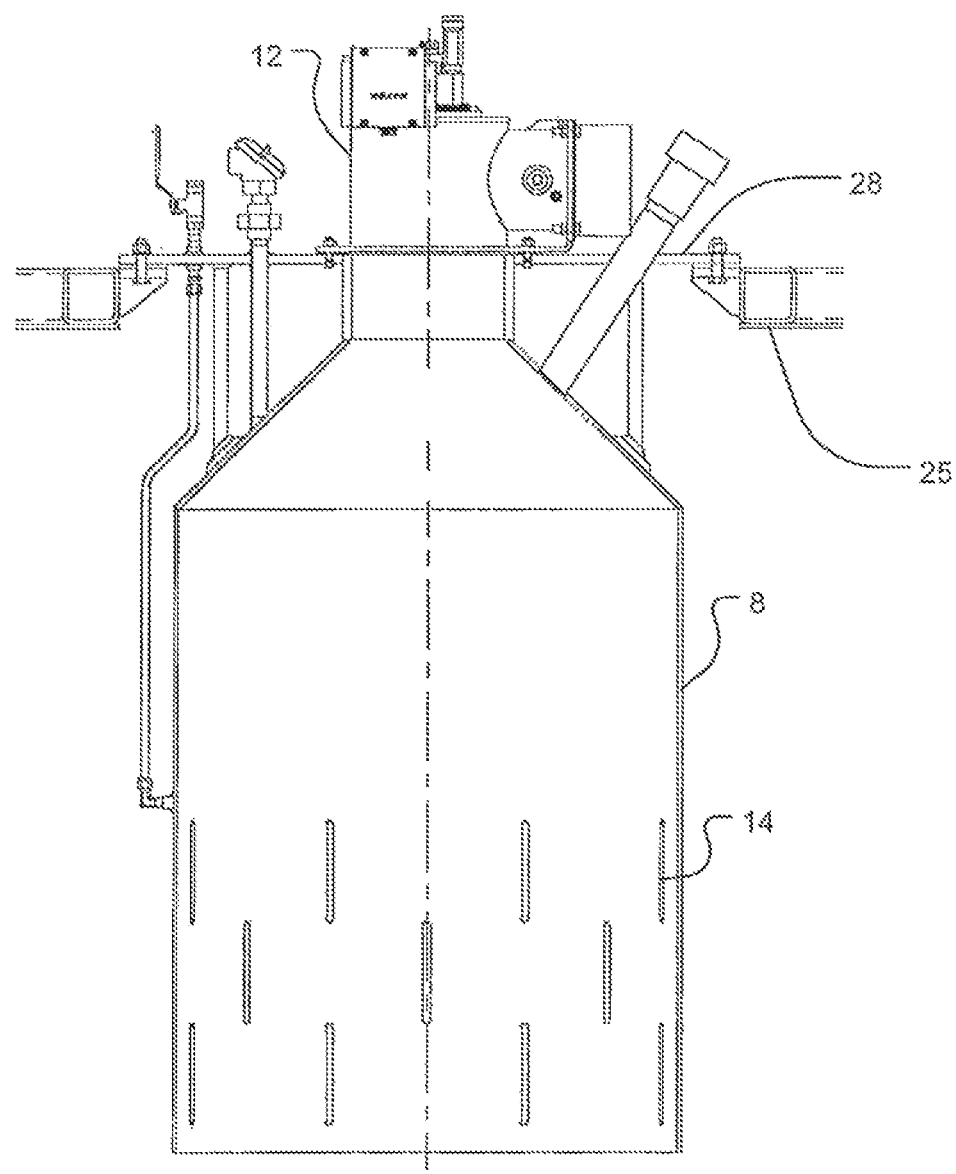
FIG. 6 illustrates a partial section elevation of the submerged combustion chamber of the water evaporator unit of FIG. 1.

FIG. 6 illustrates a detailed partial section elevation of the submerged combustion chamber 8 of the water evaporator unit 2. As seen in FIG. 6, the burner 12 is located at the top of submerged combustion chamber 8. Three tiers of staggered vertical slots 14 spaced in series around the circumference of the chamber 8 are located in the lower area of the submerged combustion chamber 8. The combustion chamber 8 is suspended from top plate 28, which is secured by bolts to top plate 25 of the cylindrical tank (not shown).

Figure 7:
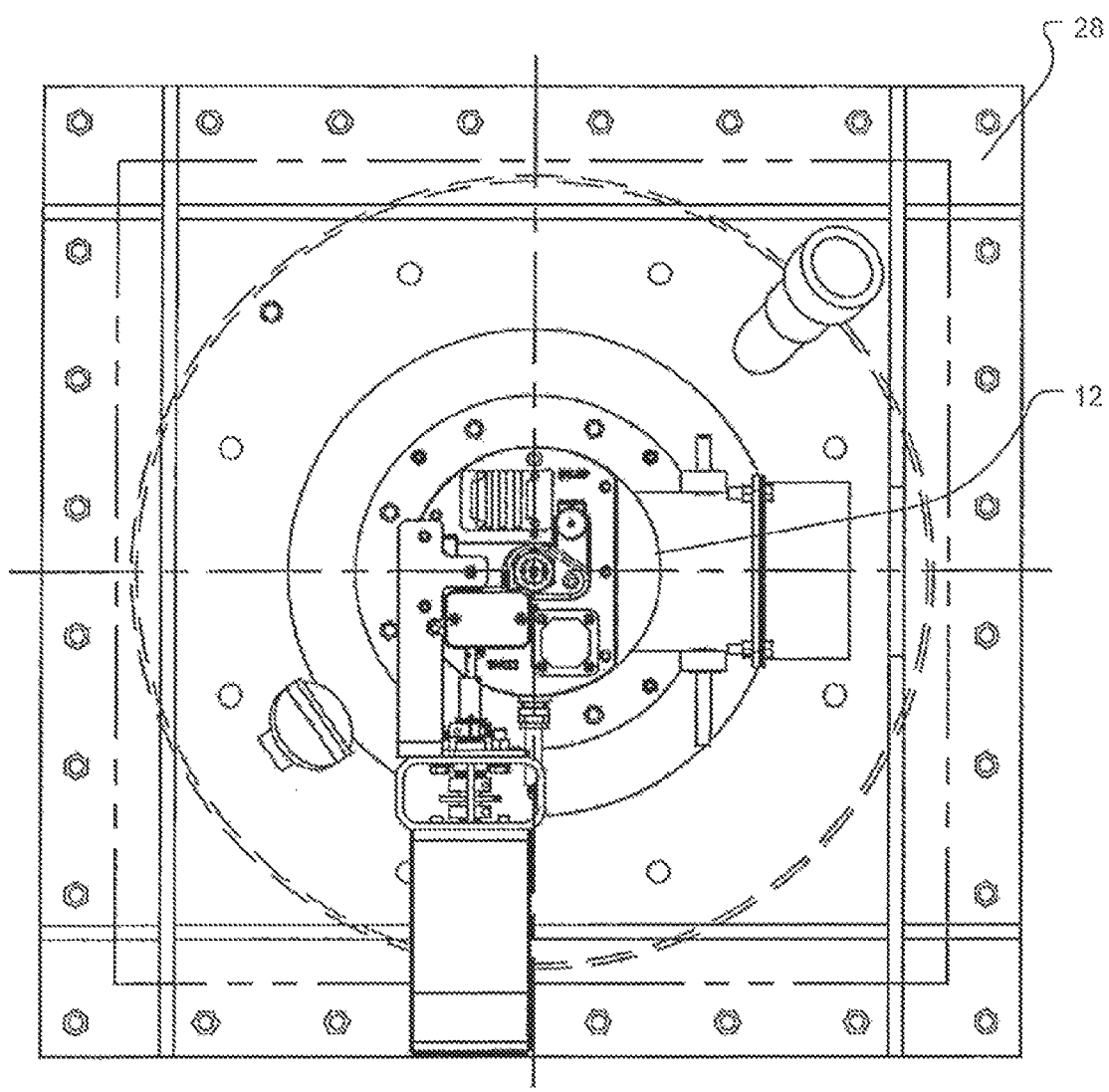
FIG. 7 illustrates a detail plan view of the top plate and burner of the water evaporator unit of FIG. 1.

FIG. 7 illustrates a detail plan view of the top plate 28 and burner 12 of the water evaporator unit 2.

The examples described above may, for example, be useful in natural gas production operations wherein waste water is continuously provided to the evaporator unit at a rate of about 2 to 7 barrels per hour, or about 84 to 294 US gallons per hour.

Figure 8:
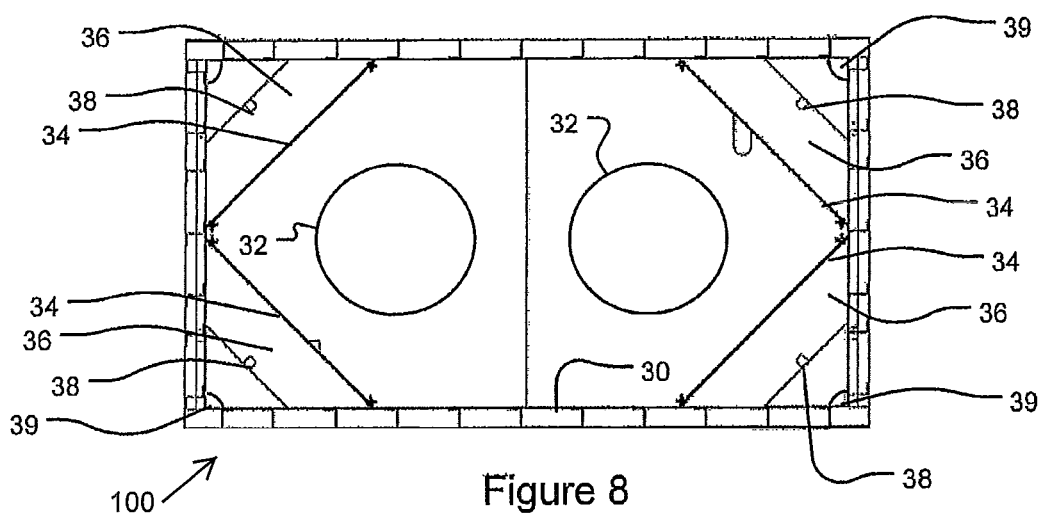
FIG. 8 illustrates a plan section view of an example water evaporator unit according to another embodiment, including a rectangular tank with two submerged combustion chambers and foam skimming weirs positioned at the four corners of the rectangular tank.
Figure 9:
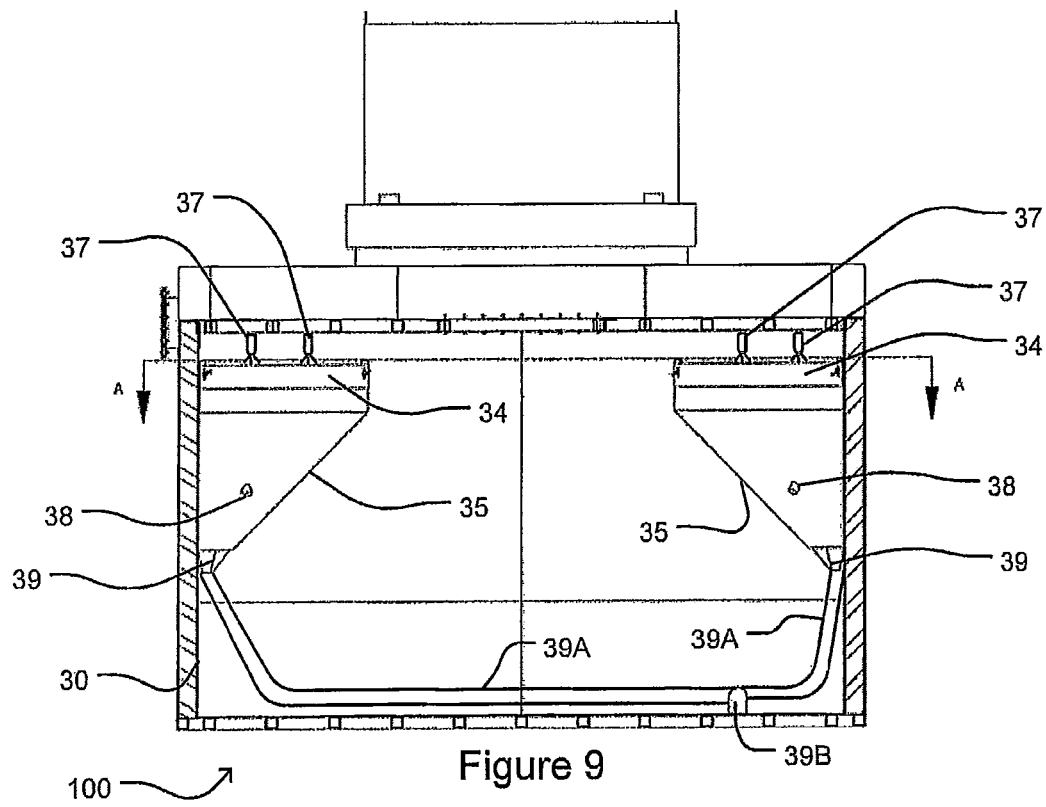
FIG. 9 illustrates a section elevation of the water evaporator unit of FIG. 8.

FIGS. 8 and 9 illustrates a plan section view of an example water evaporator unit 100, including a rectangular holding tank 30 having two submerged combustion chambers 32 suspended therein. The attachment of the pair of submerged combustion chambers 32 to the top plate of the rectangular steel tank 30 is similar to that shown previously in association with the cylindrical tank 4 illustrated in FIGS. 1 to 7. The rectangular tank 30 illustrated in FIG. 8 is particularly adapted to situations where foam accumulates on the top surface of the hot liquid in the interior of the tank 30. In a rectangular tank configuration, the corners usually have less circulation and are thus collecting points. Foam skimming weirs 34 are located at the four corners of the rectangular holding tank 30, and have angled triangular plates 35 connected to the bottoms thereof and extending to the walls of the rectangular holding tank 30 to form foam collection zones 36. Weirs 34 enable foam on the surface of the liquid in the tank 30 to spill over and be collected in the four foam collection zones 36.

Spray nozzles 37 (see FIG. 9) may be positioned to spray water into foam collection zones 36 to assist in breakdown of foam collected therein. Spray nozzles 37 may recycle water taken from the inside of the tank 30. As the foam breaks down, solids may be collected at the bottoms of the foam collection zones 36, and liquids may collect on the surface of water in the foam collection zones 36. Liquids can be extracted from the interior of the foam collection zones 36 through liquid outlets 38 located in intermediate portions thereof, and solids can be extracted through solid outlets 39 at the bottoms of the foam collection zones 36. Solids outlets 39 may, for example, be connected by piping 39A routed through the interior of the tank 30 to a common solids outlet 39B for removing solids from the tank 30. In other embodiments, solids outlets 39 may each individually exit the tank 30. Liquid extracted from the foam collection zones through the outlets 38 may be returned to the main portion of the tank 30.

Figure 11:
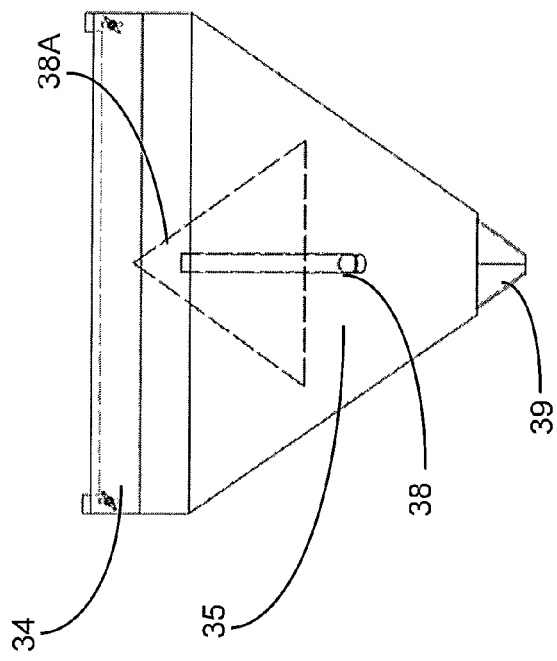
FIG. 11 illustrates a section view taken along section A-A of FIG. 10 of the foam skimming weir of the water evaporator unit of FIG. 8.
Figure 10:
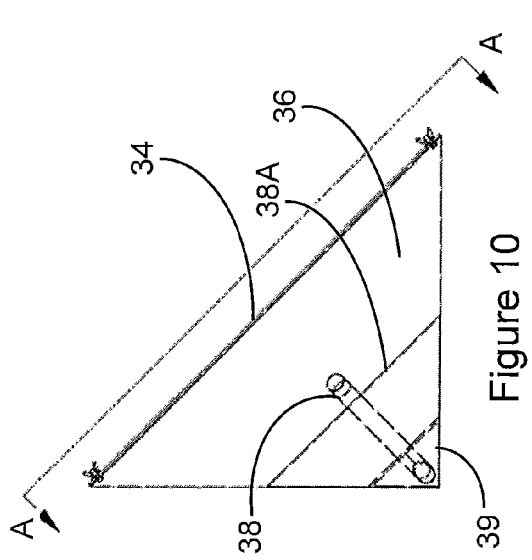
FIG. 10 illustrates a plan view of one of the foam skimming weirs of the water evaporator unit of FIG. 8.
Figure 12:
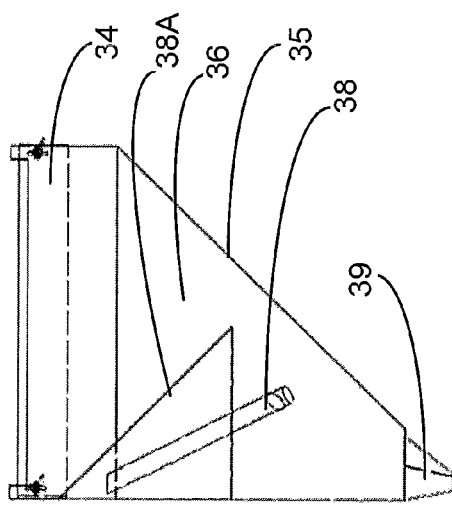
FIG. 12 illustrates a front view of the foam skimming weir of the second embodiment of the water evaporator unit.

FIG. 10 illustrates a plan view of an example foam skimming weir 34 of embodiment of FIGS. 8 and 9, with foam outlet tube 38. FIG. 11 illustrates a section view taken along A-A of FIG. 10. FIG. 12 illustrates a front view of the foam skimming weir 34 of FIG. 10. As best seen in FIG. 12, the top of the liquid outlet 38 may be located in an upper portion of the associated foam collection zone 36, and the bottom of the liquid outlet 38 may extend through plate 35. A cover 38A may be positioned over the top of the liquid outlet 38 to prevent foam from entering the liquid outlet 38. In other embodiments, foam skimming weirs, and the associated foam collection zones, may have different configurations. For example, in some embodiments a foam skimming weir may be provided about the periphery of the main holding tank.

Foaming is not generally a problem with natural gas wells that have been in production for a period of time. However, foaming is a common problem with natural gas wells that have been recently completed and the gas bearing formation has been treated with fracturing chemicals that are used to increase the permeability of the natural gas bearing formation. The example embodiment illustrated in FIGS. 8 and 9 provides a ready capability for skimming the foam off the top surface of the hot liquid in the interior of the rectangular steel tank 30.

Tests conducted with a prototype evaporator unit similar to the embodiment of FIGS. 8 and 9 resulted in 1,177 barrels (bbl; 1 bbl=42 US gallons) of water evaporated over a 24 hour period, using 529,000 cubic feet (CF) of natural gas fuel having an energy content of 860 BTU/CF. Based on these parameters, the prototype unit may be expected to evaporate water at a rate of 1250 bbl/day using 487,000 CF of natural gas fuel having an energy content of 1000 BTU/CF. Table 1 below summarizes cumulative water evaporated during testing, and Table 2 below lists average data values of certain parameters measured during testing.

TABLE 1

| Time Elapsed (hours) | Evaporated Water (gal) | Evaporated Water (bbl) | Fuel Consumption (CF) |
| --- | --- | --- | --- |
| 3 | 7813 | 186 | 81193 |
| 6 | 13611 | 324 | 143169 |
| 9 | 19461 | 463 | 205555 |
| 12 | 24878 | 592 | 263374 |
| 15 | 31471 | 749 | 333900 |
| 18 | 36145 | 861 | 383760 |
| 21 | 42879 | 1021 | 455456 |
| 24 | 49426 | 1177 | 528997 |

TABLE 2

| Parameter | Average Value During Test Duration |
| --- | --- |
| Fuel Gas BTU Content | 860 BTU/CF |
| Inlet Water pH | 6.7 |
| Inlet Water Specific Gravity | 1.02 |
| Hourly Water Flowrate | 1014 gal/h |
| Evaporator Tank Temperature | 189.5° F. |
| Evaporator Combustion Chamber Temperature | 190.0° F. |
| Evaporator Stack Temperature | 189.5° F. |

TABLE 2-continued

| Parameter | Average Value During Test Duration |
|---|---|
| Hourly Combustion Fuel Gas Flowrate | 10906 CF/h |
| Blower Air Flowrate | 1998 CF/min |
| Air/Fuel Ratio | 11.1 |
| Exhaust Excess Air | 24.8% |
| Exhaust CO Content | 76.7 ppm |
| Exhaust $O_2$ Content | 4.3% |
| Inlet Fuel Gas Pressure | 36.4 psig |
| Blower Fuel Gas Pressure | 7 psig |
| Blower Air Pressure | 3 psig |
| Blower Bearing Temperature | 146° F. |
| Blower Engine Temperature | 195° F. |
| Blower Engine Oil Pressure | 35 psig |
| Blower Engine RPM | 1872 |
| Blower Engine Fuel Pressure | 11.4 psig |
| Kohler Engine RPM | 3510 |
| Hydraulic System Pressure | 1050 psig |
| Main Pump Pressure | 100 psig |
| Spray Nozzle Pressure | 8 pisg |
| Spray Nozzle Flowrate | 19.2 gal/min |

Figure 15:
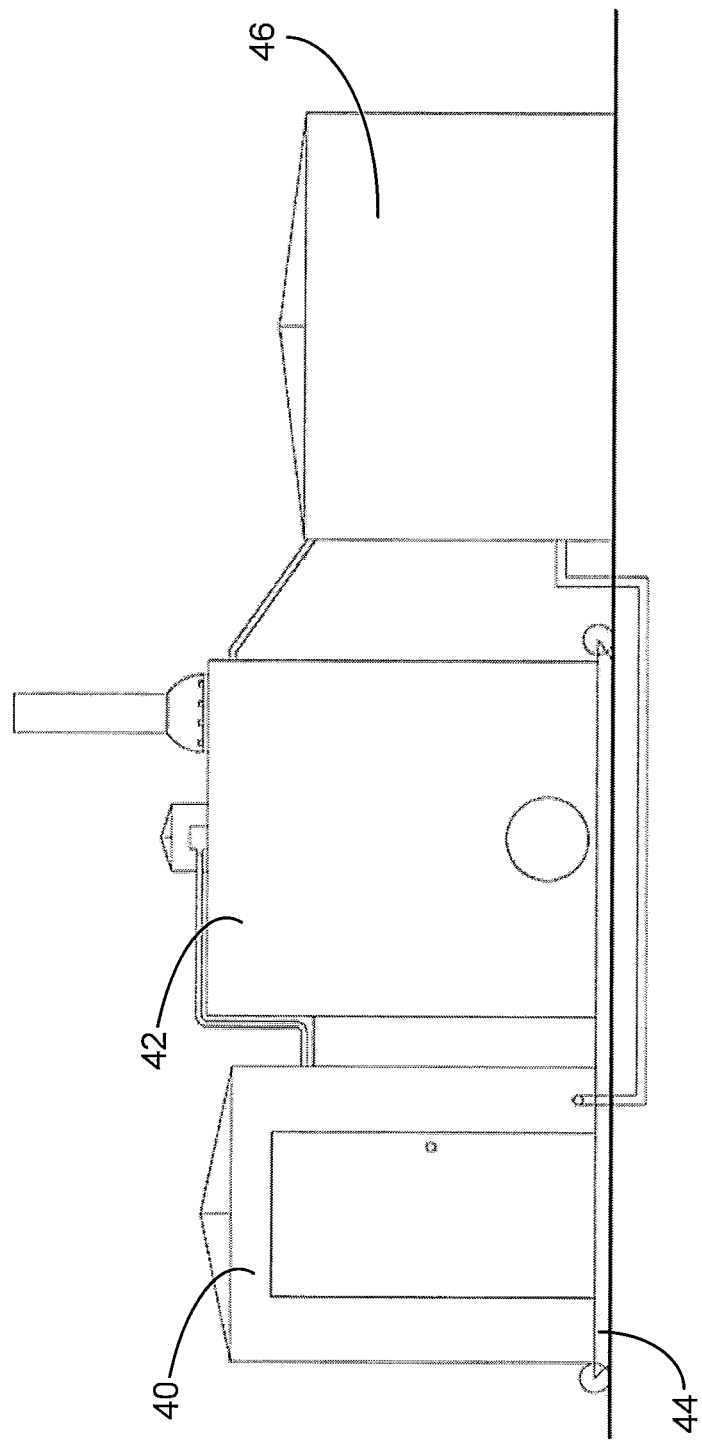
FIG. 15 illustrates an elevation of the water evaporator unit of FIG. 13 connected to an evaporated water storage tank.

FIG. 13 illustrates a top plan view of an example water evaporator unit 42 according to another embodiment. Evaporator unit 42 has an accompanying building 40 housing a natural gas driven engine and positive displacement blower. Evaporator unit 42 and building 40 are mounted on a skid 44 to facilitate transportation thereof to well sites. FIG. 14 illustrates a front elevation view, and FIGS. 14A and 14B illustrate left and right side elevation views, respectively, of the water evaporator unit 42, building 40 and skid 44 of the FIG. 13 embodiment. FIG. 15 illustrates an elevation of the skid mounted water evaporator unit 42 and building 40 connected to a water storage tank 46. In some embodiments, evaporator unit 42 and building 40 may be mounted on a wheeled trailer instead of a skid.

Figure 16:
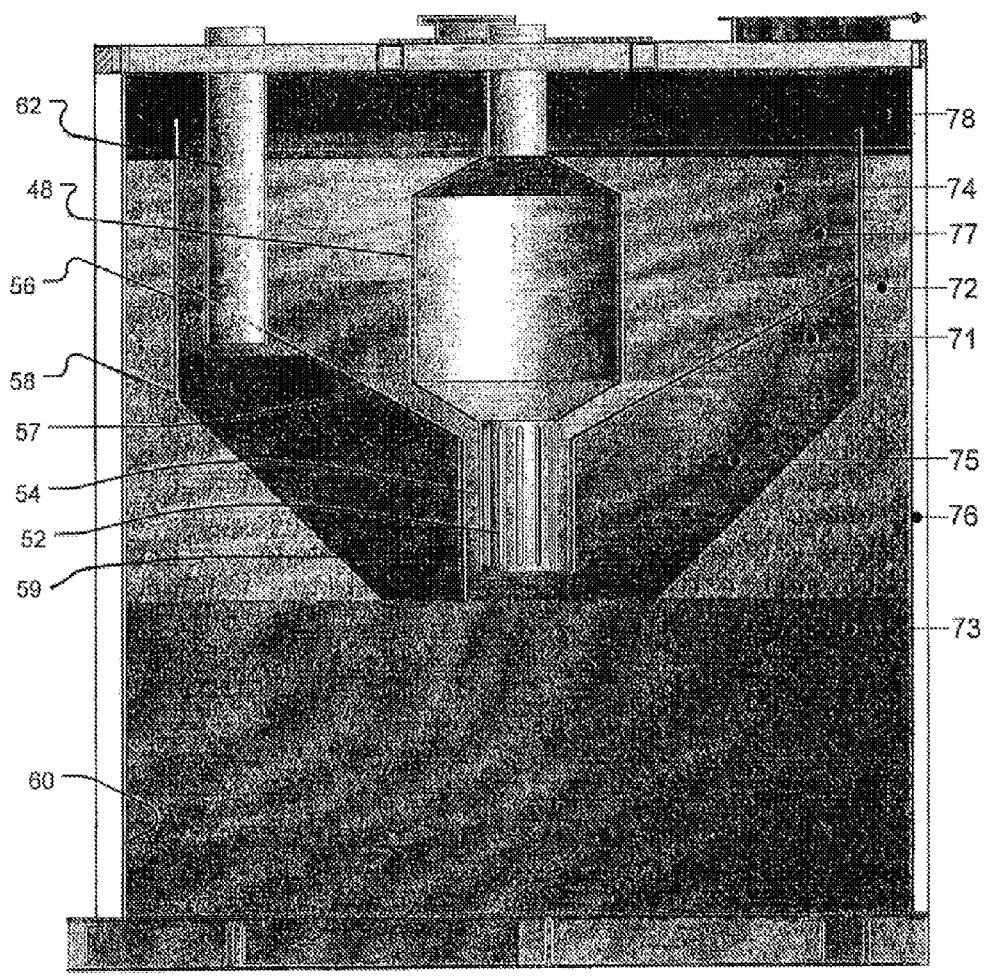
FIG. 16 illustrates a section elevation of an example water evaporator unit according to another embodiment with an alternative design of submerged combustion unit and foam trap.

FIG. 16 illustrates a section elevation view of an example water evaporator unit 50 according to another embodiment. Evaporator unit 50 comprises a cylindrical holding tank 60 within which is suspended a submerged combustion chamber 48 similar to that of FIG. 1A, having a reduced diameter cylindrical part 54 with vertical slots 52 at the bottom thereof. Although not shown in FIG. 16, the evaporator unit 50 may also comprise an inlet, an outflow, a solids outlet, and jetting ports similar to those of the embodiments of FIGS. 1 and 1A. The FIG. 16 embodiment differs from the FIG. 1A embodiment in that the FIG. 16 embodiment has a single row of vertical slots 52 which spans a substantial portion of the height of the combustion chamber 48. An inner tank 56 is disposed between the combustion chamber 48 and the holding tank 60. The inner tank 56 has a conical portion 57 and a cylindrical sleeve 59 at the bottom thereof. A foam trap 58 is provided in the space between the exterior of the inner chamber 56 and the interior of the outer tank 60. A tube level control 62 extends from the top of the tank to below the conical portion 57 of the inner tank 56. Shading is used in FIG. 16 to indicate a variety of regions 71-78 within the evaporator unit 50 as follows:

Region 71 is where incoming waste water enters the evaporator unit 50 (the inlet is not shown in FIG. 16, but may be positioned to provide liquid to region 71);
Region 72 is where foam accumulates;
Region 73 is where precipitated solids accumulate;
Region 74 is where hot gas accumulates;
Region 75 is where waste water accumulates before being evaporated;
Region 76 indicates where insulation may be applied to insulate the holding tank 60;
Region 77 is where water is generally evaporated during operation; and,
Region 78 is where water vapor accumulates before being vented through the stack (not specifically enumerated).

A portable prototype evaporator with a capacity of 250,000 BTU/hr has been built and tested on an experimental and confidential basis in a natural gas field located in Oklahoma. The prototype has been tested successfully using water from a gas wellhead separator. The prototype was capable of evaporating 95% of the water, thereby dramatically reducing haul-away water transportation costs. At the wellhead in question, the approved wastewater disposal site was located 300 miles from the gas field so transportation costs in hauling waste water from the gas field to the approved disposal site were large.

A 22,000,000 BTU/hr mobile portable evaporator similar to the examples discussed above with respect to FIGS. 8 and 9 may, for example, be used to treat flow back water obtained from a recently drilled gas well which has received formulation fracturing treatment. Such a mobile portable evaporator may be of a size that is compatible with trailer dimensions that can be transported on public roadways to gas well site locations. The water evaporator unit may, for example, utilize a centrifugal blower connected to a Chevrolet natural gas fired V8 engine.

It is also proposed to build 2,000,000 BTU/hr water evaporators for use in gas fields. Such a 2,000,000 BTU/hr water evaporator may, for example, be similar to the examples discussed above with respect to FIGS. 1 and 1A, and may be set up for relatively long term installation at a natural gas well during gas production. Such a 2,000,000 BTU/hr water evaporator may also be portable such that it can be moved to different wells as needed. Such a 2,000,000 BTU/hr water evaporator may, for example, use a positive displacement blower.

In gas well situations where foam is generated, and the foam is separated by a weir, suspended and precipitated solids that are entrained in the foam can be co-recovered along with the foam. While the foam catcher arrangement disclosed in the drawings is internal, it is also possible that the foam catcher facility can be external to the water evaporator tank. It is also possible to use foam destabilizing devices such as spray nozzles to break the foam after separation. The separated liquid is then returned to the evaporator chamber.

In locations where there is not a sufficient supply of natural gas, or alternative power systems are available and desirable, the power requirements of the evaporator unit can be run on pipeline natural gas, diesel fuel or propane, or in combination with electrical power, if available.

The nested tank design comprising a submerged combustion unit, residing inside a chamber design, which in turn resides within the exterior dimensions of the tank is a novel concept. The intermediate chamber design with a conical open bottom permits the self-egress of precipitated solids from the liquid pool that typically resides in the bottom regions of the combustion chamber.

The evaporator unit according to certain embodiments also includes a novel feature for minimizing or preventing the ingress of hydrocarbon liquids that are entrained in the feedwater that are delivered to the evaporator section of the evaporator unit.

In operation, the liquid in the tank, with the evaporation of water, tends to concentrate in the region immediately below the bottom of the submerged combustion chamber. As the solids concentrate, the salts and solids precipitate and settle through the open conical bottom of the intermediate inner chamber. The evaporator unit according to certain embodiments may, for example, be capable of evaporating 95% of the water.

Where a component (e.g. an assembly, device, etc.) is referred to above, unless otherwise indicated, reference to that component (including reference to a means) should be interpreted as including as equivalents of that component any component which performs the same function as the described component, including components which are not structurally equivalent to the disclosed structures which perform the function in the illustrated exemplary embodiments of the invention.

Unless the context clearly requires otherwise, throughout the description and the claims, the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for evaporating waste water having chemicals therein which cause foaming, the method comprising:
   providing a holding tank having an inlet for receiving waste water and one or more submerged combustion chambers with one or more burners suspended within the holding tank;
   burning fuel with the one or more burners to generate hot combustion gasses in the one or more combustion chambers to evaporate the waste water;
   skimming foam off of a surface of liquid in the holding tank with one or more foam skimming weirs located in an upper portion of the holding tank, wherein the foam spills over into the weirs and is collected therein, the one or more foam skimming weirs defining one or more foam collection zones,
   wherein the holding tank is generally rectangular, and wherein skimming foam comprises skimming foam with four foam skimming weirs configured to define foam collection zones in each of the four corners of the holding tank; and
   removing liquids from each of the foam collection zones through a liquid outlet in fluid communication with an upper portion of the associated foam collection zone; and
   removing solids from each of the foam collection zones through a solids outlet located at the bottom of the associated foam collection zone.

2. A method according to claim 1 comprising preventing foam from entering the liquid outlets by positioning a cover above a top of each liquid outlet and returning liquids removed from the foam collection zones to the holding tank.

3. A method according to claim 2 comprising spraying liquid from the holding tank into each of the foam collection zones to assist in breakdown of foam collected therein.

4. Apparatus for evaporating waste water having chemicals therein which cause foaming, the apparatus comprising:
   a holding tank having an inlet for receiving waste water;
   one or more submerged combustion chambers with burners suspended within the holding tank;
   one or more foam skimming weirs located in an upper portion of the holding tank for enabling foam on the surface of liquid in the holding tank to spill over into the one or more foam skimming weirs and be collected, the one or more foam skimming weirs defining one or more foam collection zones;
   a liquid outlet in fluid communication with an upper portion of each of the one or more foam collection zones for removing liquid from the associated foam collection zone; and
   a solid outlet in a bottom of each of the one or more foam collection zones for removing solids from the associated foam collection zone.

5. Apparatus according to claim 4 comprising one or more spray nozzles configured to spray liquid into the one or more foam collection zones to assist in breakdown of foam collected therein.

6. Apparatus according to claim 5 wherein the one or more foam skimming weirs comprise a peripheral foam skimming weir located about a periphery of the holding tank.

7. Apparatus according to claim 5 wherein the holding tank is generally rectangular.

8. Apparatus according to claim 7 comprising two combustion chambers with burners suspended within the holding tank.

9. Apparatus according to claim 7 wherein the one or more foam skimming weirs are located in corners of the holding tank.

10. Apparatus according to claim 9 wherein the one or more foam skimming weirs comprise four foam skimming weirs configured to define foam collection zones in each of the four corners of the holding tank.

11. Apparatus according to claim 10 wherein each liquid outlet is configured to return liquid from the associated foam collection zone to the holding tank.

12. Apparatus according to claim 11 comprising a cover in each foam collection zone positioned above a top of each liquid outlet and configured to prevent foam from entering the associated liquid outlet.

13. Apparatus according to claim 12 comprising piping coupled to each of the solids outlets of the foam collection zones, wherein the piping is routed through an interior of the holding tank to a common solids outlet for removing solids from the holding tank.

14. Apparatus according to claim 11 comprising a blower for providing air to the burners and an engine connected to drive the blower.

15. Apparatus according to claim 14 wherein the blower comprises one of a positive displacement blower and a centrifugal blower.

16. Apparatus according to claim 14 wherein the holding tank, the blower and the engine are mounted on one of a trailer and a skid.

* * * * *